April 8, 1958 C. E. HAHN ET AL 2,830,107
FOREHEARTH BOWL TEMPERATURE CONTROL MEANS
Filed Dec. 20, 1954

Inventors:
Clarence E. Hahn,
Sigmund Mejeran,
by Vernet C. Kauffman
Their Attorney United States Patent Office 2,830,107
Patented Apr. 8, 1958

2,830,107

FOREHEARTH BOWL TEMPERATURE CONTROL MEANS

Clarence E. Hahn, Willoughby, and Sigmund Meieran, Euclid, Ohio, assignors to General Electric Company, a corporation of New York Application December 20, 1954, Serial No. 476,114

2 Claims. (Cl. 13—6)

The present invention relates to an apparatus for maintaining the proper temperature distribution in the discharge bowl of a forehearth of a glass furnace. More particularly, the invention relates to a means for introducing heat electrically into the molten glass in the end bowl of a forehearth to control the temperature thereof and cause molten glass to issue therefrom at a substantially uniform temperature.

A common and often serious fault of the bowl portions of glass furnace forehearth is in their inability to maintain a uniform temperature within the molten glass therein. As a result, the glass issuing from the discharge orifice at the bottom of the bowl is not homogeneous and has cords.

The temperature differences in the glass "issue" from the orifice is known to result from the difference in temperature of the molten glass as it flows into and about the end of the bowl of the forehearth. The side portions of the stream of flowing glass are subject to cooling by wiping the walls of the forehearth and particularly the cylindrical end wall of the bowl. In accordance with the invention, the uneven cooling effect of the walls of the bowl on the flowing molten glass is compensated for by the selective distribution of electric resistance heat through the molten glass and the proper temperature balance is maintained by electric current passed through the molten glass between one electrode in the immediate vicinity of the center of the end wall of the bowl and a second electrode extending completely around the discharge orifice.

An object of the invention is to substantially eliminate temperature cords and other temperature differences in the molten glass issuing from the discharge orifice of the end bowl of a hearth, so as to provide a glass of satisfactory workability and avoid, as much as possible, strained conditions in the final product.

Another object of the invention is to provide apparatus for heating the molten glass in the end bowl of a forehearth by the passage of electric current therethrough and to effect the heating operation in a manner to compensate both for the heat lost by the glass to the end walls of the bowl and for the heat not received by the glass due to the shadow effect of the flow control needle of the forehearth which intercepts heat radiated from the channel portion of the forehearth. A further object of the invention is to provide such heating apparatus capable of providing additional heat quickly to the molten glass in the end bowl of the forehearth to compensate for temporary fluctuations in the temperature of the molten glass entering the bowl.

Further features and advantages of the invention will appear from the following description of a species thereof and from the accompanying drawing in which.

Figure 1:
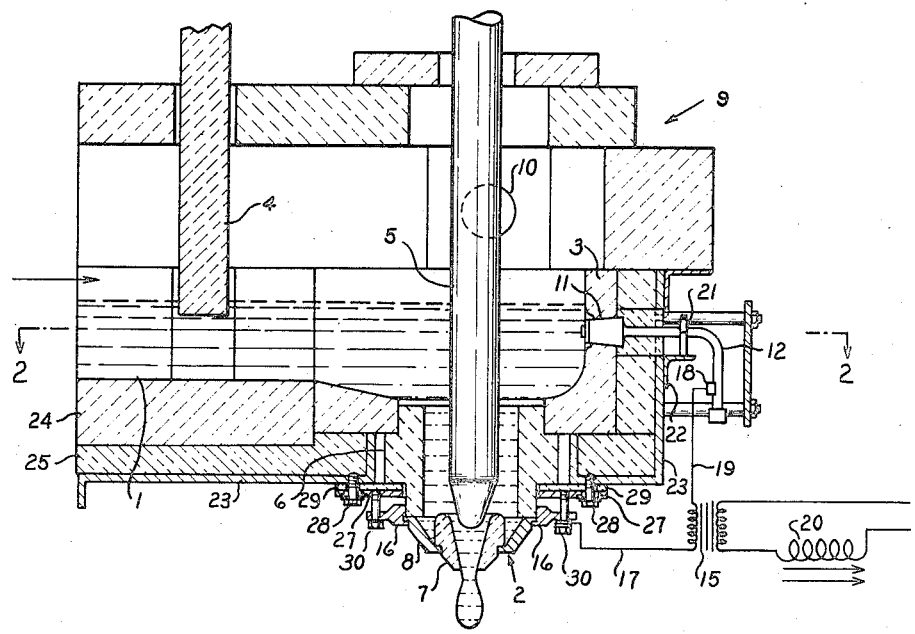
Fig. 1 is a longitudinal vertical section through the end of a forehearth having a bowl equipped with the electric heating apparatus of our invention, the view being taken substantially along the line 1—1 of Fig. 2.
Figure 2:
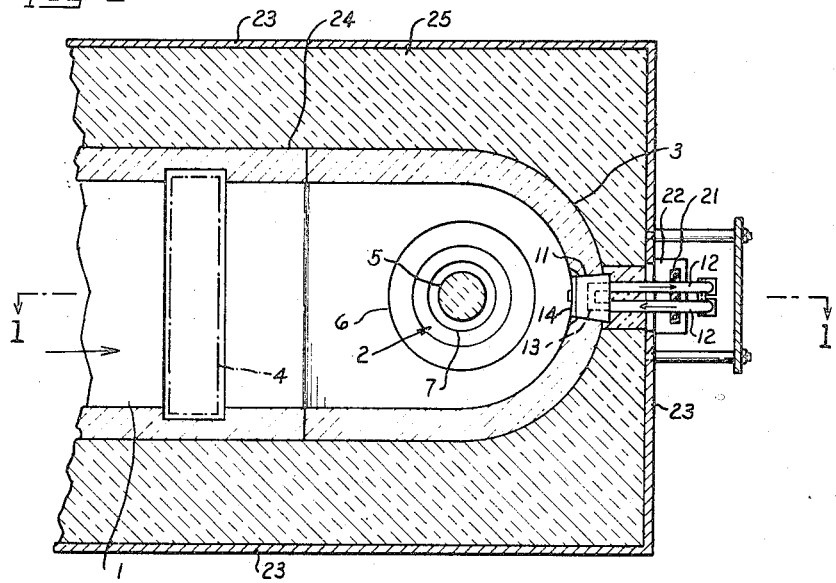
Fig. 2 is a horizontal section through the forehearth structure shown in Fig. 1, taken substantially along the line 2—2 of Fig. 1.

The normal flow of the molten glass from the glass melting tank into the forehearth shown in the drawing is along the channel 1 in the direction of the arrow to the discharge orifice structure 2 located at the bottom of the end bowl 3 of the forehearth and is subject to control both by the vertically movable gate 4 in the channel 1 and the vertically movable plunger or needle 5 in the discharge orifice structure 2. The discharge orifice is the opening in the bottom of the bowl 3 through which molten glass issues from the bowl. In the bowl of the forehearth shown in the drawing and embodying the invention, the discharge orifice is defined by an orifice bushing 6 and an orifice spout 7 which together with an annular electrode 8 comprise the orifice structure 2. The actual orifice of the bowl 3 is thus the opening or mouth of the spout 7 through which the molten glass issues.

The molten glass enters the discharge orifice structure 2 from every portion of the bowl 3 and in the course of its motion flows down through the cylindrical orifice bushing 6 and out the orifice spout 7. The ring-shaped orifice electrode 8 of metal, preferably a heat resistant chrome-iron alloy, performs the dual function of holding the orifice spout 1 in place and of making a direct electrical connection with the molten glass about the full periphery of the end of the control needle 5.

For the best results, the molten glass should enter the end bowl 3 of the forehearth fully conditioned and at a temperature substantially proper for discharge through the orifice structure 2. Gas burners are arranged in the upper refractory forehearth structure 9, as for instance in the port 10, to compensate as much as possible for the loss of heat from the flowing glass to the walls of the forehearth. Full compensation of heat loss to the end bowl 3 has, however, been impossible to achieve by burners arranged above the molten glass, inasmuch as a large proportion of the glass at the center of the stream in the channel 1 flows directly into the discharge orifice structure 2 and a small proportion of the glass in the stream wipes the side and bottom walls of the end bowl 3 and is cooled thereby before entering the discharge orifice structure 2. The glass issuing from the discharge orifice defined by spout 7 without further heat treatment is not uniformly heated throughout and in many instances is so nonuniform as to have cords of temperature difference of such magnitude as to cause it to be difficult to work into satisfactory articles.

According to the invention, glass in a much more satisfactory condition for working can be obtained from the forehearth by supplying, in addition to the heat from gas burners arranged above the molten glass, electric resistance heat generated directly in the body of the glass in the forehearth to more fully compensate for heat lost by the molten glass to the walls of the forehearth. In most instances, it is preferable to use electric resistance heat to supplement the heat from the usual gas burners, but this may not always be necessary and we contemplate that the entire heating of the molten glass to compensate for the heat losses thereof to the walls of the forehearth may be obtained by electric resistance heat generated in the body of the molten glass.

To obtain the maximum heat generation, the electrodes for passing electrical energy through the molten glass are located in the path of maximum electrical resistance through the glass. Since the electrical resistance of glass varies inversely with the temperature thereof, that is, the lower the temperature the higher the resistance, the part of maximum resistance of the molten glass in the bowl portion of the forehearth is at the center of the cylindrical end wall of the bowl, because, as pointed out above, the heat loss from the molten glass is at the maximum in the region of this wall portion of the bowl.

The amount of electric heat provided is that required to maintain uniform temperature conditions in the glass issue and may amount to only a small proportion of the compensating heat when certain glasses are melted, or in the order of half of the compensating heat as when borosilicate glasses are melted.

The preferred manner of introducing the electricity into the molten glass and controlling its distribution therethrough is achieved by having one ring-shaped electrode 8 in direct contact with the molten glass at a position adjacent the point of issue of the molten glass through the orifice spout 7 and by having a second cooperating electrode 11 in direct contact with the molten glass at a position relatively near but beneath the upper surface of the molten glass and the rim of the bowl 3, and at a position directly opposite the orifice from the entering glass in the channel 1.

The electrode 11 lies along the longitudinal center of the channel 1 and the orifice structure 2 and is thus in the immediate vicinity of the coolest portion of the bowl 3. In the instance shown, the body of electrode 11 is embedded within the end wall of the bowl 3 and contacts the molten glass only through its end which is substantially flush with the inside wall of the bowl 3.

Spaced metal pipes 12 provide the means of making the electrical connection to the electrode 11 and also of conducting water to and from the passageway 13 in the main portion thereof so as to cool and protect the electrode from the heat of the forehearth. The electrode 11 is also protected over the end surface which is in direct contact with the molten glass, by a plate 14 of molybdenum which is bolted to the main body thereof which is, except for the plate 14, made of a heat resistant chrome-iron alloy.

The electric current applied to the molten glass through the electrodes 8 and 11 is the output of the secondary of the transformer 15 which is connected on one side to the metal support collar 16 associated with the electrode 8 by the conductor 17 and the other side of which is connected by the conductor 19 to the metal clamp 18 gripping one of the pipes 12 of electrode 11. Such adjustments as are required to maintain the proper heat balance in the forehearth and in the molten glass issuing from spout 7 of the orifice structure 2 are made by conventional means in the primary supply circuit of the transformer 15, as for instance by adjustment of the variable inductive reactance 20. The cylindrical orifice bushing 6 and the orifice spout 7 are both refractory electrically insulating members and do not conduct electric current to the molten glass. The support block 21, which is in engagement with the pipes 12 extending from the electrode 11, is an electrically insulating member and electrically insulates the pipes 12 from the metal bracket 22 attached to the metal frame 23 of the forehearth.

The bottom and sides of the forehearth are of conventional structure and consist of an outer portion or layer 24 of refractory heat insulating material, which may be refractory block, lining the metal frame 23 and an inner layer 25 of glass-resistant refractory heat insulating material or flux block. The refractory orifice bushing 6 is supported by a metal ring 27 attached by electrically insulated bolts 28 to the metal frame 23 with a ring-shaped, electrically insulating member 29 interposed between the metal ring 27 and the metal frame 23. The electrode 8 is held against the lower end of orifice bushing 6 by the metal collar 16 which is attached by metal studs 30 to the ring 27 and which provides a rabbeted seat 4 and supports the refractory orifice spout 7. The collar 16 and electrode 8 are electrically insulated from the frame 23 by the structure described.

The manner of introducing heat into the molten glass described above is particularly suited to compensate for radiation from the bowl 3 of the forehearth. The flexibility of the electric heating is of great advantage, since the heat generated can easily be adjusted to suit various rates of flow through the orifice defined by spout 7 and various operating temperatures. The last advantage is obtained for the most part because any adjusted variation in the current introduced into the molten glass very quickly effects the glass issue from the forehearth. The electric heating means of the forehearth bowl is also of advantage, since it can, upon occasion, provide a convenient means of introducing relatively small increments of heat in the molten glass in addition to that required to maintain the heat balance thereof. The electric means may, for instance, be used to increase the temperature of the molten glass temporarily during the slow recovery period after adjustment to the main heating means of the glass furnace forehearth.

The described embodiment of the invention is a preferred form thereof; however, the invention is not limited to the exact structure shown as it will be understood that many modifications of the precise manner by which the invention is carried into effect as well as in the apparatus in which it is used may be made without departing from the scope of the appended claims.

What we claim as new and desire to secure by Letters Patent of the United States is:

1. A forehearth comprising a channel forming portion for conducting molten glass, an end bowl communicating with the said channel portion and having a discharge orifice structure in the bottom thereof and a cylindrical end wall opposite the said channel portion of said forehearth, a vertically moveable refractory needle extending into the discharge orifice structure of the end bowl for controlling the movement of molten glass therethrough, electrode means for making contact with molten glass in said end bowl and consisting of a pair of cooperating electrodes, one of said electrodes being embedded in said cylindrical end wall with its inner surface flush with the inner surface of said wall at a point directly opposite the center of the discharge orifice from the said channel portion, the other of said electrodes extending about the full periphery of the discharge orifice of said bowl, and means for supplying electrical energy to said electrodes whereby to cause passage of electricity through molten glass in said bowl in a path terminating in the vicinity of the coolest section of the cylindrical end wall of the bowl of the forehearth and around the discharge orifice to effectively compensate for the shadow effect of the needle and the uneven cooling effect of the walls of the bowl on molten glass flowing through the bowl.

2. A forehearth comprising a channel forming portion for conducting molten glass, an end bowl communicating with the said channel portion and having a discharge orifice structure in the bottom thereof and a cylindrical end wall opposite the said channel portion of said forehearth, a vertically moveable refractory needle extending into the discharge orifice structure of the end bowl for controlling the movement of molten glass therethrough, electrode means for making contact with molten glass in said end bowl and consisting of a pair of cooperating electrodes, one of said electrodes being a water cooled electrode embedded in said cylindrical end wall with its inner surface flush with the inner surface of said wall at a point directly opposite the center of the discharge orifice from the said channel portion, the other of said electrodes extending about the full periphery of the discharge orifice of said bowl, and means for supplying electrical energy to said electrodes whereby to cause passage of electricity through molten glass in said bowl in a path terminating in the vicinity of the coolest section of the cylindrical end wall of the bowl of the forehearth and around the discharge orifice to effectively compensate for the shadow effect of the needle and the uneven cooling effect of the walls of the bowl on molten glass flowing through the bowl.

References Cited in the file of this patent

UNITED STATES PATENTS

| | | |
|---|---|---|
| 1,458,522 | Clark | June 12, 1923 |
| 1,680,543 | Howard | Aug. 14, 1928 |
| 2,179,224 | Soubier | Nov. 7, 1939 |
| 2,186,718 | Ferguson | Jan. 9, 1940 |
| 2,276,295 | Ferguson | Mar. 17, 1942 |
| 2,283,800 | Ferguson | May 19, 1942 |
| 2,591,709 | Lubatti | Apr. 8, 1952 |